United States Patent [19]

Grossi

[11] Patent Number: 4,745,155

[45] Date of Patent: May 17, 1988

[54] EMULSIFIED CRACK OR JOINT FILLER

[75] Inventor: Anthony V. Grossi, Newark, Ohio

[73] Assignee: Owens-Corning Fiberglas Corporation, Toledo, Ohio

[21] Appl. No.: 911,596

[22] Filed: Sep. 25, 1986

[51] Int. Cl.$^4$ .............................................. C08L 95/00
[52] U.S. Cl. .................................. 525/54.5; 524/60; 524/61; 524/62; 524/68; 524/71
[58] Field of Search ..................... 524/68, 62, 60, 71, 524/61; 525/54.5

[56] References Cited

U.S. PATENT DOCUMENTS

| | | | |
|---|---|---|---|
| 4,273,685 | 6/1981 | Marzocchi et al. | 260/28.5 |
| 4,316,829 | 2/1982 | Roberts | 260/28.5 |
| 4,394,481 | 7/1983 | Grossi et al. | 525/54.5 |
| 4,419,489 | 12/1983 | Grossi et al. | 525/54.5 |
| 4,456,633 | 6/1984 | Grossi et al. | 427/138 |
| 4,507,365 | 3/1985 | Lower et al. | 428/489 |
| 4,609,696 | 9/1986 | Wilkes | 524/68 |
| 4,654,385 | 3/1987 | Roberts et al. | 524/69 |

Primary Examiner—Allan M. Lieberman
Attorney, Agent, or Firm—Patrick P. Pacella; Robert F. Rywalski

[57] ABSTRACT

The present invention provides an aqueous emulsion joint and crack filler capable of passing the ASTM Specification 1190 for joint and crack fillers. The emulsion solids are the reaction product of asphalt, an extender oil, a mixture of elastomers, an acrylamide and a vinyl monomer. The preferred elastomer mixture includes a liquid rubber and at least one block copolymer of styrene and a conjugated diene, such as triblock and diblock copolymers of styrene and butadiene. The preferred emulsion medium is water containing a surfactant and an acrylamide polymer. The emulsion is poured at ambient temperature into a joint or crack, and cures rapidly to ensure minimal traffic interruption.

15 Claims, No Drawings

EMULSIFIED CRACK OR JOINT FILLER

TECHNICAL FIELD

The present invention relates to an emulsified asphalt-based crack or joint filler which can be applied cold to a distressed roadway to replace the present dangerous and expensively applied hot pour fillers. The emulsions of the present invention meet the exacting penetration, flow and cold temperature (0° F.) bonding requirements of ASTM Specification D1190. Generally, the emulsions include chemically-modified asphalt compositions emulsified in an aqueous emulsion medium to provide a stable composition which can be poured or pumped without heating directly into a roadway crack or joint. Under ambient highway conditions of 70° to 85° F., a roadway repaired with the present emulsions can be opened to traffic after about one hour.

BACKGROUND AND SUMMARY OF THE INVENTION

Open cracks and joints in concrete or asphaltic concrete pavements present a path for intrusion of water into the base and sub-base of the highway. Water intrusion beneath the pavement causes erosion of the foundation and accummulated water can cause the pavement to break up due to alternate freezing and thawing cycles. Water intrusion ultimately contributes to the failure of the pavement structure.

Various types of crack and joint fillers or sealers have been developed to solve the problems of open cracks and joints. The great majority of such crack and joint fillers are asphaltic in nature, and the incorporation of rubber or other elastomers into an asphalt-based filler increases the flow resistance, the low-temperature flexibility and the adherence of the fillers to the crack or joint walls to provide a longer lasting seal which can better resist pavement contraction and expansion during freeze-thaw cycles. The prior asphalt or rubber-asphalt sealers must be "hot-poured" at temperatures ranging from about 300° to about 400° F., and they are typically applied from double boiler, oil-jacketed melter applicators which are equipped with an agitator and separate temperature indicators for the oil bath and the melting vat.

Many problems have developed in the utilization of such hot-poured fillers, including the danger of fire and other accidents encountered in the use of combustion heaters, the thermal degradation of the fillers as they are maintained at temperatures on the order of 300° to 400° F. over long periods of time, the necessary cleaning of the heating and applying apparatus at the end of each working day, and the necessity for specialized vehicles to transport the heavy and cumbersome heating equipment. All in all, the utilization of hot-pour crack and joint fillers is both dangerous and expensive.

Several attempts have been made in the past to provide water-based emulsions of asphalt-rubber crack and joint fillers which can be poured at ambient temperatures and which avoid all of the dangers and expenses of the conventional hot-poured fillers. However, prior to the present invention, it has not been possible to provide an aqueous-based, cold-pour joint and crack filler capable of meeting ASTM Specification D1190 which has been adopted by a majority of the State Highway Administrations as the standard for asphalt-rubber joint and crack fillers. The exacting standards of the ASTM Specification D1190 define the functional characteristics required of asphalt-elastomer blends and thus would apply to that portion of the emulsified filler remaining after the emulsion water has been evaporated. Generally, these requirements of ASTM D1190 include a residue penetration at 77° F. of 90 or less, flow at 140° F. of 5 mm or less, and passing five complete bonding cycles at 0° F. The test methods for all three of these specifications is set forth in ASTM Test Method D1191.

The present invention provides an aqueous emulsion, the residue of which meets the requirements of the ASTM 1190 Specification. Generally, the emulsion of the present invention includes a chemically-modified asphalt which is the reaction product of certain ingredients reacted at an elevated temperature for an extended period of time under reflux, and the reaction product is then emulsified in an emulsification medium including water, a surfactant, and a thixotropic agent.

Generally similar reaction products from different reaction mixtures have been defined and disclosed in several previous patents assigned to the assignee of the present invention, namely U.S. Pat. Nos. 4,394,481; 4,507,365; 4,456,633; and 4,419,489. In particular, U.S. Pat. No. 4,419,489 proposes an aqueous emulsion for possible use as a joint sealer for highways or the like, but the disclosed emulsion cannot meet the ASTM Specification D1190. Similar emulsions are also disclosed in U.S. patent application Ser. No. 839,482, filed Mar. 14, 1986 and assigned to the assignee of this invention, but again the disclosed emulsions would not meet the requisite ASTM Specification.

The specific emulsion of the present invention includes the reaction product of asphalt, an extender oil, a mixture of elastomers, preferably including liquid rubber and at least one block copolymer of an ethylenic monomer and a conjugated diene, an acrylamide and styrene. These reaction products are reacted at an elevated temperature, typically on the order of 300° F. to 400° F. (149° to 204° C.) for an extended period of time, on the order of 20 to 30 hours, under reflux. The reaction product is emulsified in an aqueous emulsification medium, preferably a medium containing from about 0.5 to about 7% by weight surfactant, and from about 0.01 to about 0.20% of a high molecular weight acrylamide as a viscosity control ingredient.

The final emulsion is formed in suitable apparatus, such as a colloid mill or the like, and it contains from about 30% to about 45% emulsification medium and from about 55% to about 70% of the asphaltic ingredient.

The resulting asphalt emulsion possesses suitable viscosity and flow characteristics to be applied as a crack and joint filler or sealant either by simply pouring the emulsion into the crack or by filling the crack with the emulsion under pressure dispensed from a wand.

DETAILED DESCRIPTION OF THE PRESENT INVENTION AND INDUSTRIAL EXPLOITATION

The chemically-modified asphalt ingredient of the emulsion of the present invention, as above explained, is prepared by reacting asphalt, an extender oil, a mixture of elastomers, an acrylamide and styrene for an extended period of time at an elevated temperature under reflux.

As above explained, the emulsion residues pass the requirements of ASTM D-1190, which requires the following:

(a) A penetration value not to exceed 90 at 77° F. (25° C.), when tested according to Specification ASTM D-1191-64 (76);

(b) A flow at 140° F. (60° C.) not to exceed 5 mm. A sample is molded to a size 60 mm×40 mm×3.2 mm, cooled and heated in an oven at 140° F. at an angle of 75° for 5 hours. The change in length from the molded length (60 mm) is measured. See ASTM D-1191-64 (76).

(c) Five complete cycles at 0° F. (−17.8° C.). Cement blocks 1×2×3 inch are prepared, cured, and ground to expose the aggregate. Each test specimen is molded between two such blocks spaced 1 inch apart. Each specimen is cured at 0° F. for at least 4 hours, and the blocks are separated 0.5 inch at a rate of ⅛ inch per hour, thus extending the specimen 50%. Each specimen is recompressed at room temperature for 2 hours to its original thickness. Five such cycles of extension at 0° F. and recompression at room temperature constitutes one complete bond test. See ASTM D-1191-64 (76).

The asphalt ingredient of the reaction mixture of the present invention preferably is a soft asphalt flux having a penetration ranging from about 210 to about 325 at 77° F. Asphalt having penetrations of from about 250 to about 300 are most preferred. Asphalt supplied by Trumbull Asphalt Division of Owens-Corning Fiberglas Corp. and designated as DT4044 or 4105 having a penetration of 250 to 300 is an example of a preferred asphalt. An amount of asphalt ranging from about 65% to about 75% by weight of the reaction mixture is preferred.

The extender oil of the reaction mixture preferably is a hydrocarbon oil which is high in saturates and low in aromatics. The presently preferred extender oil is sold by Shell Chemical Company under the designation SHELLFLEX 371 which is an asphaltene-free, low-polar constituent hydrocarbon oil containing naphthenic and paraffinic constituents and having a molecular weight on the order of 400.

The extender oil preferably is added (1) to aid in forming the desired rubber blend in the asphalt, i.e., to ensure an even and uniform distribution of the elastomers in the asphalt component; (2) to add resilience to the emulsion residue; (3) to reduce the stiffness of the emulsion residue; and (4) to aid in emulsifying the reaction product in the aqueous emulsion medium. The extender oil preferably constitutes from about 2% to about 10% by weight of the reaction ingredients.

The mixture of elastomers incorporated into the reaction mixture preferably includes a liquid rubber, such as a hydroxy-terminated polymer (either a homopolymer of copolymer) of a conjugated diene. Particularly useful are the commercially available "POLY B-D" butadiene polymers from Arco Chemical Company, a division of Atlantic-Richfield Co. The series of such polymers include hydroxy-terminated butadiene homopolymers, such as POLY B-D R-15M or POLY B-D R-45M or POLY B-D 45HT, which has a hydroxyl functionality of 2.4 to 2.6; the hydroxy-terminated butadiene acrylonitrile polymers like POLY B-D CN-15; and the hydroxy-terminated butadiene-styrene copolymers such as POLY B-D CS-15.

The liquid rubber also aids in ensuring adequate bonding of the emulsion residue at 0° F. when tested as specified in ASTM D1190. This corresponds to the bonding of the emulsion residue to the walls of a crack or joint. There appears to be a correlation between the ability of the emulsion residue to bond for 5 cycles at 0° F. and its low-flex temperature, i.e., the temperature at which the emulsion residue can be bent about a one-inch mandrel without cracking or breaking. Generally, it has been found that bonding for 5 cycles at 0° F. (required by the ASTM 1190 Specification) can be achieved where the residue remains flexible at −30° F. or less. For example, certain examples of the present invention including about 2% liquid rubber are flexible at −40° F. and meet the bonding requirements of 5 cycles at 0° F. Also, there appears to be a correlation between the penetration of the residue and its low temperature bonding.

Penetration is a measure of residue stiffness, and a stiff residue will fail the bond test which requires passing 5 cycles at 0° F. If the penetration is below about 70, adequate bonding strength is difficult to attain. Thus, it is preferred that the residue penetration is between about 70 and the maximum penetration of 90 allowed by the 1190 specification. Hot viscosity of the reaction product appears to be indicative of emulsifiability. A screening test can be utilized which requires a hot viscosity (at 210° F.) of the reaction product which is less than about 100,000 cps.

The elastomers also include rubbery polymers, preferably at least one block copolymer formed by the copolymerization of one or more of the conjugated dienes, e.g., butadiene or isoprene, with one or more ethylenic or vinyl monomers, such as styrene. The preferred additional elastomers are block copolymers of monoalkenyl arene polymers and elastomeric conjugated diene polymers. The number of blocks in the block copolymer is not of special importance, and the molecular configuration of the block copolymer can be linear, graft, radial or star, depending upon the method by which the block copolymer is formed. Block copolymers having end blocks of styrene and midblocks of butadiene or isoprene are particularly preferred.

Such block copolymers are available under the tradename "FINAPRENE" available from Cogsden Oil and Chemical Company of Dallas, Tex. and "KRATON" available from Shell Chemical Company of Houston, Tex. Specifically preferred block copolymers include Kraton 1101 which is a triblock copolymer of butadiene and styrene having a molecular weight of about 1,000, and Kraton 1118 which is a diblock copolymer of styrene and butadiene also having a molecular weight of about 1,000. Both of these preferred copolymers contain about 30% styrene component and about 70% butadiene component. In the most preferred embodiment of the present invention, the reaction components contain a mixture of both Kraton 1101 and Kraton 1118. Generally, the amount of diblock copolymer exceeds the amount of triblock copolymer. Preferably, from about 2 to about 5% triblock copolymer and from about 7% to about 15% diblock copolymer are present in the reaction mixture.

The presence of the block copolymer of styrene and a conjugated diene, i.e., butadiene or isoprene, aid in both the low temperature flexibility and the resilience of the residue. The diblock copolymer (e.g., Kraton 1118) also aids in the attainment of bonding strength and resilience characteristics. While the triblock copolymer (e.g., Kraton 1101) may be eliminated, if desired, a mixture of diblock and triblock copolymers is presently preferred. Also, it is preferred to utilize a minimum of about 12% by weight total block copolymer, and as much as 20% total block copolymer may be present in the reaction mixture.

The acrylamide included in the reaction components is unpolymerized and has a double bond. Several specific suitable acrylamides are disclosed in detail in U.S. Pat. No. 4,419,489. The most preferred acrylamide for use in the present invention is dimethylaminopropylmethacrylamide (DMAPMA), having the formula $CH_2=C(CH_3)C(O)N(H)(CH_2)_3N(CH_3)_2$. From about 0.1% to about 3% by weight acrylamide is present as a reaction ingredient.

Suitable polymerizable vinyl aromatic monomers for use in the reaction mixture of the present invention are disclosed in detail in U.S. Pat. No. 4,419,489. From about 5% to 10% by weight styrene monomer is preferred as a reaction ingredient in the present invention.

The reaction ingredients and the proportions of such ingredients are summarized in Table I:

TABLE I

| Ingredient | Weight % |
| --- | --- |
| Asphalt | 65–75 |
| Extender Oil | 2–10 |
| Hydroxy-terminated Polymer of a Conjugated Diene | 1–6 |
| Block Copolymer | 9–20 |
| Vinyl Monomer | 5–10 |
| Acrylamide | 0.1–3 |

Table II lists preferred and specific reaction ingredients of the present invention.

TABLE II

| Ingredient | Preferred Range | Composition I (Weight %) | Composition II |
| --- | --- | --- | --- |
| Asphalt (210–300 pen) | 65–75 | 71.5 | 69 |
| Extender Oil | 4–10 | 5 | 7.5 |
| Liquid Rubber | 1–6 | 2 | 2 |
| Triblock S—B—S | 2–5 | 3 | 3 |
| Diblock S—B | 7–15 | 10 | 10 |
| Styrene | 5–10 | 8 | 8 |
| DMAPMA | 0.1–3 | 0.5 | 0.5 |

The aqueous emulsion medium which is utilized in emulsifying either the chemically-modified asphalt or the asphalt-elastomer blend preferably is water containing from about 0.5 to about 3% by weight of a surfactant, an amount of surfactant ranging from about 0.5 to about 7% by weight being preferred. The surfactant can be cationic, anionic or non-ionic, cationic being preferred. The fatty amines, most desirably fatty primary monoamines, are particularly useful. Specifically, Arosurf AA-60 (a modified tallow) can be utilized.

A thickener or thixotropic agent is added to the emulsion medium as a viscosity control and as an aid in drying the emulsion in place after the emulsion has been used as a crack or joint filler. The present invention proposes the utilization of from about 0.25 to about 10 weight percent of a 2% solution of Cyanamer P-250 as a thixotropic agent which is incorporated into the aqueous emulsification medium. Cyanamer P-250 is a polyacrylamide available from American Cyanamid Co., Wayne, N.J., and is a non-ionic homopolymer of acrylamide having a molecular weight of approximately 5 million to 6 million. If desired, the thixotropic agent (P-250) can be added with thorough mixing after the emulsion is formed, rather than being dissolved in the aqueous medium prior to emulsification.

Preferably, the final emulsion is formed in a colloid mill with the molten asphalt and the aqueous emulsification medium being simultaneously added to the mill, the molten asphalt component being at a temperature of from about 250° F. to about 300° F., preferably about 285° F., and the aqueous emulsification medium having been preheated preferably to a temperature of from about 100° F.

After the final emulsion is formed, it preferably is cooled in a heat exchanger in order to stabilize the emulsion at a given viscosity. Generally, the lower the temperature of the final emulsion, the lower the ultimate viscosity of the emulsion. Preferably, the final emulsion is cooled to a temperature of about 100° to about 125° F. to obtain an emulsion of the requisite viscosity for use as a crack and joint filler.

The final emulsion will contain from about 30 to about 45%, preferably about 32% to about 40% of the emulsification medium, and from about 55% to about 75% of the asphaltic ingredient, and preferably from about 60% to about 68%. The final emulsion contains from about 55 to about 75% solids, preferably from about 60% to about 68%.

The emulsion, at ambient temperature, may be simply poured into an existing crack or open joint. Alternatively, the emulsion may be introduced into a crack or joint by a wand or pressure line connected to a suitable receptacle in which the emulsion is stored under pressure.

Although the emulsion may require several hours or even days for complete evaporation of the emulsion water at a temperature of about 70° F., it has been found that a roadway having cracks or joints filled with the sealant of the present invention and at a road temperature of 70° to 85° F. can be opened to traffic within about one hour after application.

EXAMPLE I

Using a charge of about 69% DT4044 asphalt, about 7.5% Shellflex 371, about 2% Arco Poly BD 45HT, about 10% Kraton D1118, about 3% Kraton 1101, about 0.5% dimethylaminopropylmethacrylamide, and about 8% styrene (all weight %), a composition of the present invention was prepared. The asphalt was charged and heated to about 110° C. in a reactor equipped with an agitator and a reflux condenser. The Shellflex, Poly BD, Kratons, DMAPMA, and styrene were added in that order. The reaction mixture was heated with agitation and under reflux at a temperature of 170° C. for about 24 hours. The reaction product was cooled and removed from the reactor.

The reaction mixture hot viscosity was 74,900 cps at 210° F. (25 rpm) and 2,500 cps at 285° F. (50 rpm), and the penetration at 77° F. was 102.

The reaction mixture at about 250°–300° F. was emulsified to a solids content of 55 to 57% in an emulsion medium (at a temperature of about 100° F.) of 100 parts water, 2.25 parts Arosurf AA-60, and 1.25 of a 2% aqueous solution of Cyanamer P-250. The emulsion pH was adjusted to 3.0 using hydrochloric acid.

The emulsion was prepared by utilizing a colloid mill and by passing the emulsion through a heat exchanger.

The resulting emulsion was of suitable viscosity and flow characteristics to be applied as a crack or joint sealant.

The emulsion was poured out, air-dried for several days and oven-dried in sample dishes at about 250° F. until foaming and bubbling ceased.

Samples of the emulsion residue were tested by an independent testing laboratory according to ASTM 1190 and 1191, and the following results were obtained:

| | |
|---|---|
| Penetration (77° F.) | 79, 78 (two samples) |
| Resilience | 52, 51 (two samples) |
| Flow at 140° F. | 0, 0.1 (two samples) |
| Bond at 0° F. (5 Cycles) | Pass (one sample) |

Thus, the emulsion of Example I conformed to the ASTM 1190 Specification.

EXAMPLE II

Following the procedure of Example I, a reaction product was prepared from the reaction ingredients:

| Ingredient | Weight % |
|---|---|
| DT4044 Asphalt | 71.5 |
| Shellflex 371 | 5 |
| Arco Poly BD 45 HT | 2 |
| Kraton D1118 | 10 |
| Kraton D1101 | 3 |
| DMAPMA | 0.5 |
| Styrene | 8 |

The resultant reaction product had the following properties:

The reaction mixture hot viscosity was 52,000 cps at 210° F. (25 rpm) and 1,875 cps at 285° F. (50 rpm), and the penetration was at 77° F. was 108.

The reaction product was emulsified as described in Example I and the emulsion had the following properties:

10,000 cps at 77° F., as determined by Brookfield #2 spindle at 2½ rpm.

The emulsion residue was obtained as described in ASTM Procedure D244, which eliminates the air drying specification of Example I, and had the following properties:

| | |
|---|---|
| Penetration (77° F.) | 86, 88, 88 (three samples) |
| Bond (0° F.) | Passed (three samples) |
| Flow (140° F.) | 0, 0.0 (three samples) |

I claim:

1. An emulsified composition useful as a cold-pour crack and joint filler, said composition comprising an aqueous emulsion of the reaction product of an asphalt having a penetration of about 210 to about 325, an extender oil, which is a hydrocarbon oil, a mixture of elastomers, said mixture including a liquid rubber and at least one block copolymer, said liquid rubber being a hydroxy terminated homopolymer or copolymer of a conjugated diene and said block copolymer being a copolymer of one or more conjugated dienes and one or more ethylenic monomers, a vinyl aromatic monomer and an acrylamide, and the reactant materials being selected and employed in amounts so that the solid emulsion residue meets the requirements of ASTM Specification D-1190.

2. A composition as defined in claim 1, wherein the liquid rubber is a hydroxy-terminated homopolymer of butadiene.

3. A composition as defined in claim 1, wherein the mixture of elastomers includes at least one block copolymer of styrene and a conjugated diene.

4. A composition as defined in claim 1, wherein the mixture of elastomers includes a mixture of a triblock copolymer of styrene a butadiene and a diblock copolymer of styrene and butadiene, the amount of said diblock copolymer exceeding the amount of said triblock copolymer.

5. A composition as defined in claim 1, wherein the vinyl aromatic monomer is styrene.

6. An emulsified composition useful as a cold-pour crack and joint filler, said composition comprising the reaction product of:

| Ingredient | Weight % |
|---|---|
| Asphalt of Penetration 210–300 | 65–75 |
| Extender Oil which is a Hydrocarbon Oil | 2–10 |
| Hydroxy-terminated Polymer of a Conjugated Diene | 1–6 |
| Block Copolymer of a Conjugated Diene and a Vinyl Monomer | 9–20 |
| Vinyl Monomer | 5–10 |
| Acrylamide | 0.1–3 | reacted under reflex for an extended period at an elevated temperature and emulsified in a cationic emulsification medium comprising water, a surfactant and a high molecular weight acrylamide polymer, and the reactant materials being selected and employed in amounts so that the solid emulsion residue meets the specification of ASTM Specification D-1190.

7. A composition as defined in claim 6, wherein the hydroxy-terminated polymer is a hydroxy-terminated homopolymer of butadiene.

8. A composition as defined in claim 6, wherein the block copolymer is a mixture of about 2% to about 5% of a triblock copolymer of styrene and butadiene and about 7% to about 15% of a diblock copolymer of styrene and butadiene.

9. The method of making an emulsified composition useful as a cold-pour crack and joint filler, said composition having an emulsion solids residue meeting ASTM Specification D-1190, comprising the steps of reacting an asphalt having a penetration of about 210–about 325, an extender oil which is a hydrocarbon oil, a liquid rubber which is a hydroxy-terminated polymer of a conjugated diene, at least one block copolymer of one or more conjugated dienes and one or more ethylenic monomers, a vinyl aromatic monomer and an acrylamide for about 20 to about 30 hours at a temperature of from about 300° F. to about 400° F. under reflux to obtain a reaction product, and emulsifying the reaction product in an emulsification medium of water, a surfactant and a high molecular weight acrylamide, the reactant materials being selected and employed in amounts so that the solid emulsion residue meets the requirements of ASTM Spefication D-1190.

10. A method as defined in claim 9, wherein the conjugated diene is butadiene.

11. A method as defined in claim 9, wherein the at least one block copolymer is a block copolymer of styrene and a conjugated diene.

12. A method as defined in claim 11, wherein the at least one block copolymer is a mixture of a diblock copolymer and a triblock copolymer.

13. A composition as defined in claim 3, wherein the mixture of elastomers includes a mixture of a triblock copolymer of styrene and butadiene and a diblock copolymer of styrene and butadiene.

14. An emulsified composition useful as a cold-pour crack and joint filler, said composition comprising an aqueous emulsion of the reaction product of an asphalt, which has a penetration of from about 210 to 325 at 77° F., an extender oil which is a hydrocarbon oil high in saturates and low in aromatics, a mixture of elastomers wherein said mixture includes a liquid rubber, which is a hydroxy-terminated homopolymer or copolymer of a conjugated diene and wherein said mixture further includes a mixture of a triblock copolymer of styrene and butadiene and a diblock copolymer of styrene and butadiene, a vinyl aromatic monomer and an acrylamide, the reactant materials being selected and employed in amounts so that the solid emulsion residue meets the requirements of ASTM Specification D-1190.

15. The composition of claim 14 wherein said ethylenic monomer is styrene.

* * * * *